(12) United States Patent
Gaultney et al.

(10) Patent No.: US 6,253,959 B1
(45) Date of Patent: Jul. 3, 2001

(54) MEASURING AND DISPENSING SYSTEM FOR SOLID DRY FLOWABLE MATERIALS

(75) Inventors: Lawrence Doka Gaultney, Elkton, MD (US); Joseph Francis Gerling, West Grove, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/403,617

(22) PCT Filed: Apr. 21, 1998

(86) PCT No.: PCT/US98/08016

§ 371 Date: Nov. 5, 1999

§ 102(e) Date: Nov. 5, 1999

(87) PCT Pub. No.: WO98/50765

PCT Pub. Date: Nov. 12, 1998

Related U.S. Application Data
(60) Provisional application No. 60/046,332, filed on May 7, 1997, now abandoned.

(51) Int. Cl.[7] .................................................. B67D 5/08
(52) U.S. Cl. .............................. 222/55; 222/56; 222/413
(58) Field of Search ................................ 222/1, 55, 56, 222/413

(56) References Cited

U.S. PATENT DOCUMENTS

| | | | |
|---|---|---|---|
| 3,677,540 | 7/1972 | Weiss | 222/23 |
| 4,054,784 | 10/1977 | Ricciardi et al. | 364/479 |
| 4,558,659 | 12/1985 | Alden | 118/653 |
| 4,629,164 | 12/1986 | Sommerville | 239/69 |
| 4,688,610 | 8/1987 | Campbell | 141/83 |
| 4,805,673 | 2/1989 | Wöhrle et al. | 141/10 |
| 4,895,274 | 1/1990 | Morimoto et al. | 222/63 |
| 5,029,624 | 7/1991 | McCunn | 141/346 |
| 5,184,754 | 2/1993 | Hansen | 222/55 |
| 5,189,965 | 3/1993 | Hobbs et al. | 111/178 |
| 5,350,089 | 9/1994 | Preiser | 222/413 |
| 5,413,154 | 5/1995 | Hurst | 141/83 |
| 5,938,074 | * 8/1999 | Dartus | 222/56 |

FOREIGN PATENT DOCUMENTS

| | | |
|---|---|---|
| 29 49 856 | 6/1981 | (DE) . |
| WO 95/10363 | 4/1995 | (WO) . |

OTHER PUBLICATIONS

Asano seiki K.K., Measuring Device for Amount of Supply of Powder Material, *Patent Abstracts of Japan*, 6, No. 92, 119, Feb. 15, 1982.

Vetter G. et al., Schuttgutmechanische Auslegung Von Dosierdifferentialwaagen Mit Schneckenaustrag, *Wagen Und Dosieren*, 24, No. 4, 3–16, Jul. 1, 1993.

Vetter G., Dosieren Zur Prozessautomatisierung–systematik, materialfluss, Dosiergenauigkeit, *Wagen Und Dosieren*, 23, No. 1, 6–8, Feb. 1, 1992.

* cited by examiner

*Primary Examiner*—Philippe Derakshani
*Assistant Examiner*—Thach H. Bui

(57) ABSTRACT

A portable apparatus for measuring and dispensing solid dry flowable materials, comprising a hopper for containing material, a quantitative measuring device having a dispensing outlet, material inlet means in communication with said hopper and said quantitative measuring device for regulating the flow of material between, system control means in communication with quantitative measuring device for controlling type of measurement and quantity of material and a receptacle in communication with the dispensing outlet of said quantitative measuring device. The invention includes a method of measuring a solid dry flowable material comprising feeding the material into a quantitative measuring device having a screw, rotating the screw a specified number of turns dependent upon material type and quantity of material desired such that material is transported along the length of the screw to material outlet means while being measured and metered and passing the material through the material outlet means and directly into a receptacle.

11 Claims, 3 Drawing Sheets

MEASURING AND DISPENSING SYSTEM FOR SOLID DRY FLOWABLE MATERIALS

CROSS REFERENCE TO RELATED APPLICATIONS

This application was filed under 35 U.S.C. 371 from International Application No. PCT/US98/08016 filed Apr. 21, 1998 which claims priority benefit of Provisional Application No. 60/046,332 filed May 7, 1997, now abandoned.

FIELD OF THE INVENTION

The present invention relates to a system for measuring and dispensing solid dry flowable materials. More particularly, the present invention relates to apparatus for measuring and dispensing solid dry flowable agricultural products.

BACKGROUND OF THE INVENTION

Apparatus and devices for handling granular chemicals have been developed for a variety of purposes. U.S. Pat. No. 5,029,624 discloses a closed granular chemical handling system comprising a dispensing valve and a receiving valve that are configured to operate in a desired sequence. U.S. Pat. No. 4,054,784 discloses a weigh feeder system including a device for controllably discharging a substance from a container and apparatus for weighing the container. WO95/10363 pertains to a metering device for dry direct injection into a spray tank. Dosieren zur Prozenβautomatisierung—Systematik, Materialfluβ, Dosiergenauigkeit, by G. Vetter, Wägen und Dosieren, vol. 23, no. 1, (1992) discloses dosing applications and various dosing methods. There exists a need for a portable apparatus to accurately measure and dispense solid flowable materials such as dry flowable (DF) materials especially in agriculture where hand held measuring devices are routinely used in field conditions.

SUMMARY OF THE INVENTION

A portable apparatus for measuring and dispensing solid dry flowable materials, comprising:
   a hopper for containing material;
   a quantitative measuring device having a dispensing outlet;
   material inlet means in communication with said hopper and said quantitative measuring device for regulating the flow of material therebetween;
   system control means in communication with quantitative measuring device for controlling type of measurement and quantity of material; and
   a receptacle in communication with the dispensing outlet of said quantitative measuring device.

The present invention also includes a method of measuring a solid dry flowable material comprising feeding the material into a quantitative measuring device having a screw, rotating the screw a specified number of turns dependent upon material type and quantity of material desired such that material is transported along the length of the screw to a material outlet means while being measured, metered and reduced in particle size, and passing the material through the material outlet means and directly into a receptacle.

BRIEF DESCRIPTION OF THE DRAWINGS

The invention can be more fully understood upon having reference to the accompanying drawings described as follows.

DETAILED DESCRIPTION OF THE INVENTION

It is an object of the present invention to provide a portable system for accurate measuring and dispensing of solid dry flowable materials. Solid dry flowable materials of this invention are powders, granules, or in general, solid materials which are flowable. Typical solid dry flowables can be, but are not limited to, agricultural products, pharmaceuticals, inorganic or organic pigments, plastics, cosmetics, foods like dehydrated dairy products, animal feeds and the like. Product specific refers to a single product. This invention is especially useful for providing a portable means to transfer low use rate agricultural products in a way that minimizes spillage, accurately measures and dispenses a specific product, provides minimum operator exposure to the product dispensed, improves recordkeeping, labeling and inventory control.

SYSTEM DESCRIPTION

Figure 1:
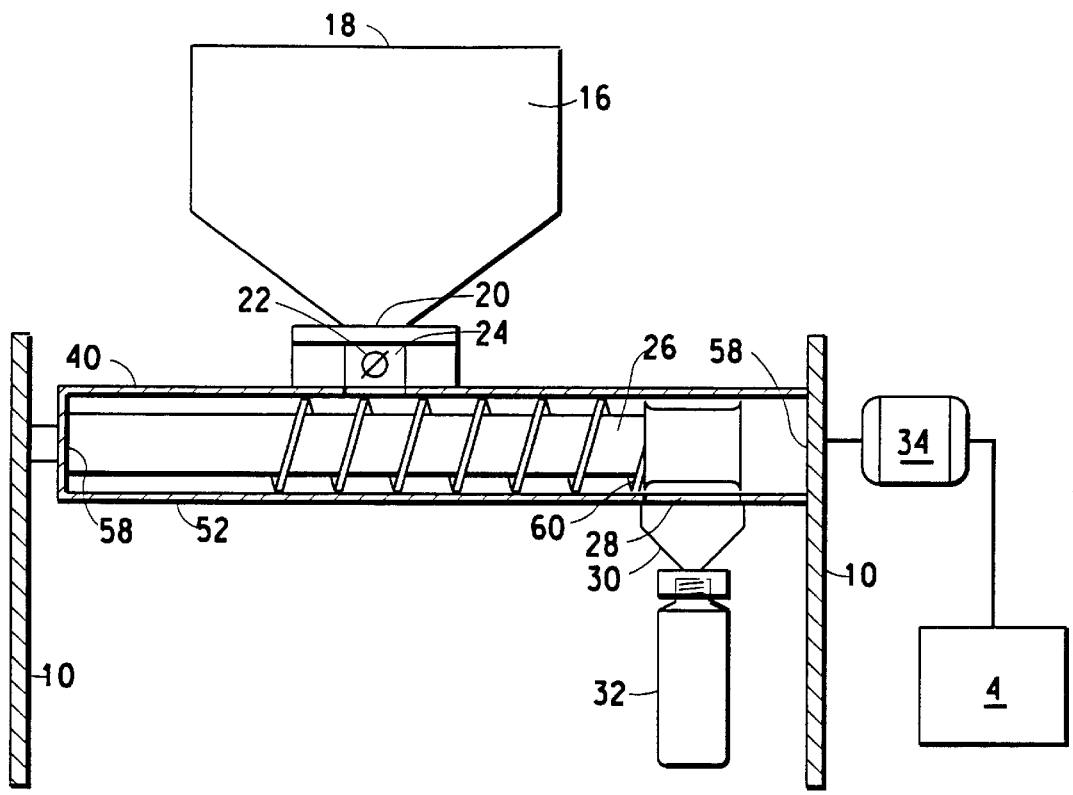
FIG. 1 is an illustration of the measuring and dispensing apparatus.
Figure 3:
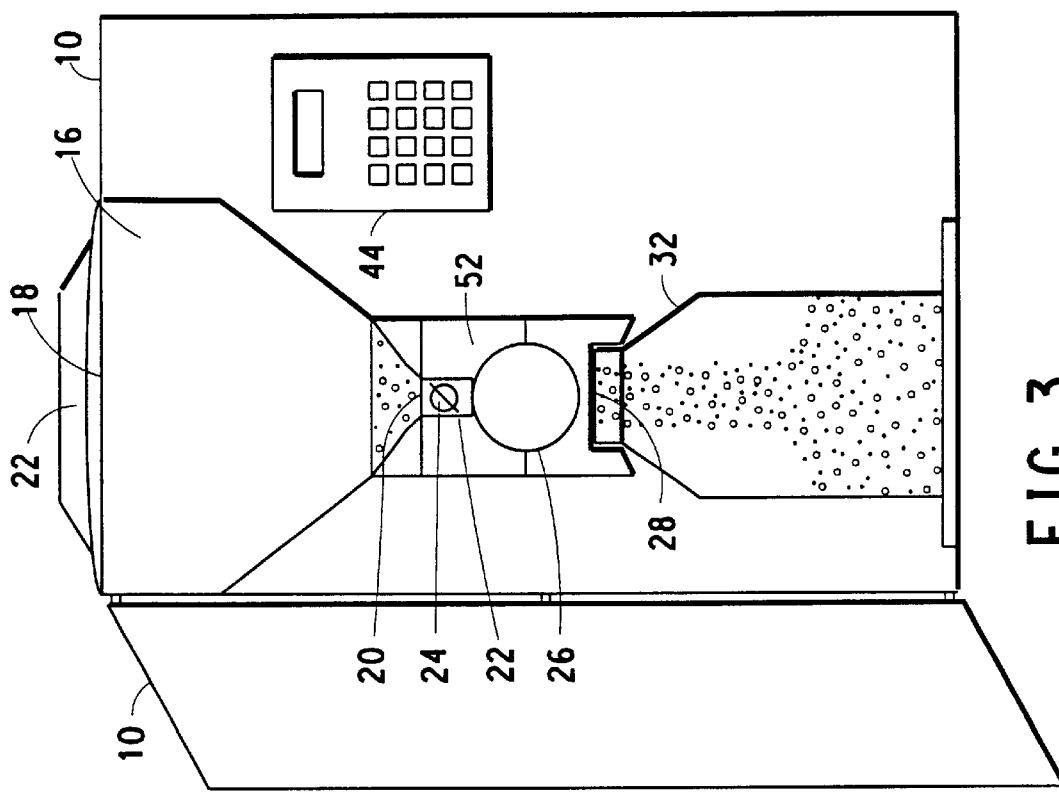
FIG. 3 is a front view of the measuring and dispensing apparatus.
Figure 2:
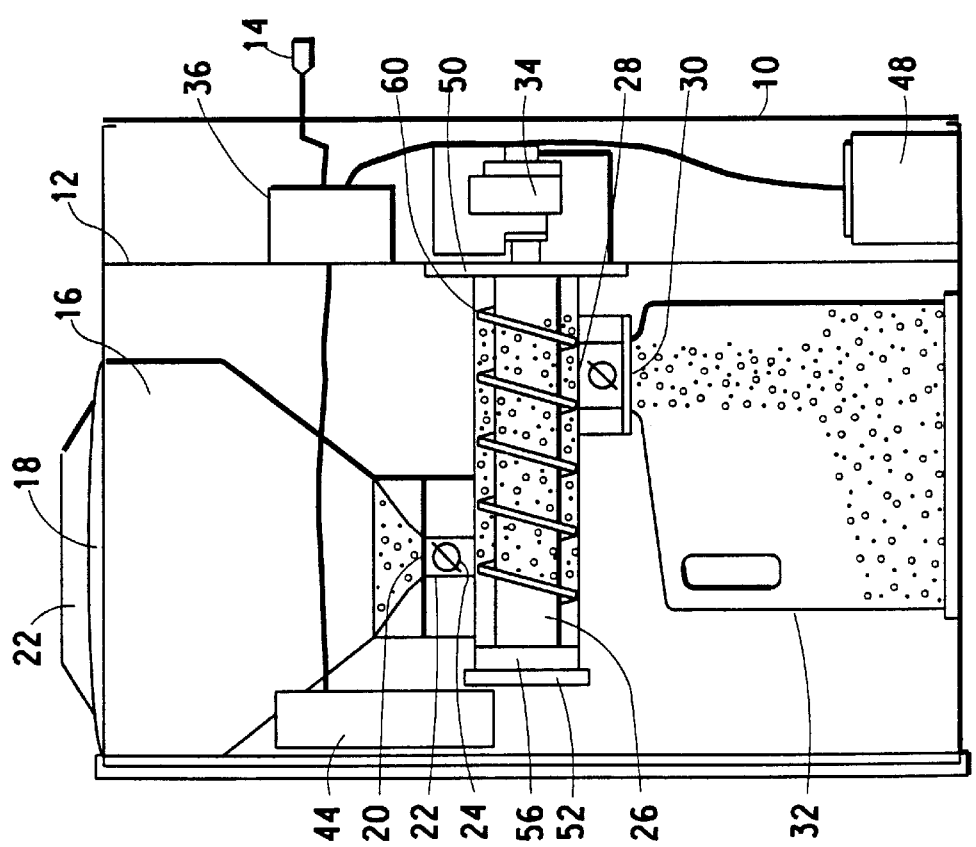
FIG. 2 is a side view of the measuring and dispensing apparatus.

This invention can be more fully understood from the following detailed description of the invention. Having reference to FIGS. 1, 2 and 3, there is shown a system useful for measuring and dispensing solid dry flowable materials.

The measuring and dispensing system comprises a weather proof, lockable cabinet within which is mounted housing (12). Within lockable cabinet (10) is on/off power strip (14) which controls electrical power to the system. Housing (12) contains the operating components of the system. Mounted in the upper portion of housing (12) is hopper (16) having inlet opening (18) and outlet opening (20). Hopper (16) is capable of containing a suitable amount of solid, dry flowable material and can be connected to and operated in cooperation with material inlet means (22). Hopper (16) is preferably made of a material that is resistant to corrosion and that has a relatively low coefficient of friction. In a preferred embodiment, the hopper can be sealed substantially air-tight. Normally hopper (16) will be mounted on top of, i.e., above, quantitative measuring device (26) of the present invention, and the material will be gravity fed to the material inlet means. Alternative means for introducing material to material inlet means (22) and sealing the apparatus can be used without departing from the present invention.

Attached to the bottom of hopper (16) surrounding outlet opening (20) is material inlet means (22) shown here as an electronic shutoff valve but which can be a manual shutoff valve. Material inlet means (22) allows the material to flow out of hopper (16) and into quantitative measuring device (26). Material inlet means (22) is shown here equipped with interlock sensor (24) which ensures that material inlet means (22) is in the open position before dispense of material is initiated from hopper (16).

Mounted in housing (12) is quantitative measuring device (26) to receive receptacle (32) and ensure proper alignment under material outlet means (22). The components of quantitative measuring device (26) are optionally mounted on a frame support (50) and device housing (52) for convenient access. The quantitative measuring device (26) can comprise an exchangeable module. One embodiment of quantitative measuring device (26) can measure the weight of material being dispensed into receptacle (26). Another embodiment of quantitative measuring device can measure the volume of material being dispensed into receptacle (32) and is dependent upon the bulk density of the material. An example of quantitative measuring device (26) for weight measurement is a 10K loadcell #MS4010 from measurement specialists of Palm Bay, Fla. Those skilled in the art will readily appreciate that other devices may be used.

Description of Volumetric Measuring Device

Figure 4:
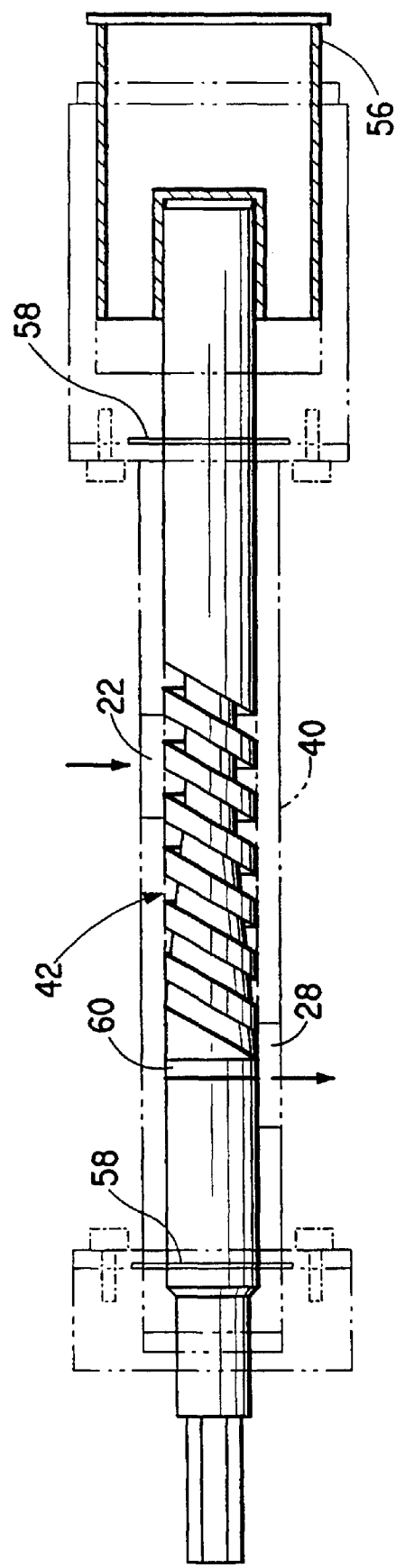
FIG. 4 is a schematic representation of a side view of one embodiment of the quantitative measuring device of the apparatus of the present invention.

An example of quantitative measuring device (26) for volumetric measurement can be found in the PCT publication WO95/10363 and is depicted in a schematic side view in FIG. 4 herein.

Longitudinal screw housing (40) having a cylindrical cavity has positioned within it screw (42) having flights designed to measure, transport and reduce the size of the solid dry flowable material that enters screw housing (40) by means of material inlet means (22) which is adjacent to screw (42) at one end of screw housing (40) and exits screw housing (40) and enters receptacle (32) at the other end through dispensing outlet (28) and material outlet means (30).

Material inlet means (22) connects hopper (16) to screw housing (40) and admits material to a first portion of screw (42). Material inlet means includes a port in screw housing (40) which is suitably at least the width of 1 flight and preferably at least 1.5 flights so that composition is preferably being feed to more than one screw-flight. The port is also of a dimension and location such that preferably the particulate composition is always fed to a constant-depth portion of screw described hereinafter even when the longitudinal position of screw (42) is adjusted within screw housing (40), as described hereinafter.

Means (56) for adjusting the longitudinal position of screw (42) within screw housing (40) adjusts the position of the screw flights relative to material inlet means (22) and material outlet means (30) which are in fixed position on screw housing (40).

The amount of adjustment is limited so that material inlet means (22) will always feed to a constant-depth portion of screw flight.

Means (34) for rotating screw (42) relative to screw housing (40) shown here as drive motor (34) is preferably adjustable by system control means (36) so that rpm of screw (42) can be varied, and once adjusted it must hold constant so that a steady amount of material is transported from inlet to outlet and into receptacle (32). Suitable means (34) includes a variable speed motor coupled to the screw shaft such that the motor has sufficient power to turn the screw at suitable rpm. Coupling of rotating means (34) to the shaft must be able to accommodate the longitudinal adjustment of screw (42).

Screw (42) is mounted within housing such that the ends of screw (42) or a shaft that is supporting screw (42) form a seal with the respective ends of screw housing (42) such that if material inlet means (22) and material outlet means (30) are also sealed, none of the material that may enter the cavity will be able to exit the cavity other than through material outlet means (30). Close tolerances between the shaft ends and the respective portions of screw housing (40) can provide a seal to prevent passage of any material other than through material outlet means (30). Preferably there are additional seals (58) at each end of screw housing (40); such seals (58) include standard lip seals (single, double or triple) or pressure sealing rings. Preferred are lip seals.

The constant depth portion of screw (42) is at the inlet end of screw (42), and flights with a tapered shaft become increasingly more shallow toward the outlet end.

The constant-depth flights are preferably at least as deep as the diameter of the largest particle of the material, and preferably at least three times as wide as the diameter of the largest particle. The threads on screw (42) which form the flights can be any one of various shapes including triangular, square, rectangular, rounded or trapezoidal. Rectangular threads are preferred. The longitudinal distance between the center of the threads parallel to the screw axis is known as the pitch. Feed rate will be determined by the pitch, the depth of the threads, the slope of the threads, the shape of the threads and the speed at which the screw is rotated. The pitch chosen for screws useful in the apparatus of the present invention will preferably be from 0.1 to 3 per centimeter. A pitch of about 1 thread per centimeter is generally preferred for agricultural compositions in which the active ingredient is a sulfonylurea or materials of similar potency, which are generally applied at rates of ounces per acre. Of course, if less potent, larger volume compositions are used, a larger screw with a different screw configuration will be used to get the appropriate feed rate.

The shaft supporting screw (42) contains at least one groove (60) around the circumference of the shaft at a location on the shaft between the last screw flight at the outlet end of screw (42) and the seal formed between the outlet end of the shaft of the screw and the outlet end of screw housing (40), with the at least one groove (60) positioned on the shaft at a location adjacent to material outlet means (30). Groove (60) around the circumference of the shaft at a position on shaft between the last screw flight at the outlet end and the seal formed between the outlet end of the screw shaft and the outlet end of the housing helps prevent the exiting particulate composition from being forced into the outlet end seal (58) instead of dropping freely through the outlet into receptacle (32). Groove (60) is connected to the last flight, is at least as deep and wide as the last flight, and is smooth so as to avoid any points where solid composition might collect. Preferably groove (60) is deeper and wider than the last flight.

Screw housing (40) and screw (42) can be made of any hard, wear-resistant material. Preferably screw housing is stainless steel and the screw is stainless steel or hardcoat anodized aluminum. Other parts of the present apparatus can be made of stainless steel, plastic, plexiglass, wood or other non-rusting, non-corroding sturdy materials.

SYSTEM OPERATION

The system is first calibrated to ensure that an accuarate quantity of material is metered each time. In the operation of the apparatus of the present invention, the material is loaded in the hopper and the hopper is preferably sealed. When the quantitative measuring device is activated, the material passes from the hopper, through material inlet means, into the quantitative measuring device and is forced toward the material outlet means. For volumetric measurements by the quantitative measuring device, adjustments to the number of turns of the screw controls the amount of material dispensed. For weight measurements by the quantitative measuring device, weight measurement controls the amount of material dispensed.

A user will enter an amount of product required (or alternatively, a rate and number of acres) on a weather proof keyboard and the device will meter the required the amount of product into receptacle (32). To dispense product, receptacle (32) is placed under dispensing outlet (28) or material outlet means (30), if present, and material inlet means (22) is opened. The desired amount is entered into system control means (36) using the numeric key pad (44). The dispense cycle is initiated by pressing a start button ( ) which activates the quantitative measuring device (26) through system control means (36). Once the desired amount has been dispensed quantitative measuring device (26) shuts off automatically. System control means (36) at material outlet means (22) is closed and receptacle (32) is removed.

To operate the system, product is loaded into hopper (16) and the operator first turns on the system using the electrical on/off switch located on power strip (14). Upon power up, the system control means (36) displays a request for a 4 digit Personal Identification Number (PIN). This number, which has been previously programmed into the system, controls access to the dispensing cycle of the system. Once the operator's PIN number has been entered using the numeric keypad (44), and accepted the display advances to the main operating screen. This screen provides access to the dispensing routine, a display of current hopper inventory and the update inventory routine. The update inventory routine is used when product is added to hopper (16). Access to update inventory routine is protected by a second 4 digit PIN which can be different from the power up PIN and controls who has access to inventory updating. When the dispensing routine is selected, a "Job Number" is requested. This "Job Number", which is entered by the operator, provides unique identification for each batch dispensed. Once the "Job Number" has been entered, the display prompts the operator to place an empty receptacle (32) on or beneath quantitative measuring device (26). The screen then displays the quantity requested and prompts the operator to press the "start" button to open material outlet means (30) and begin the actual dispense. Product is then dispensed into receptacle (32) until the targeted amount minus a preset quantity is reached. The system then goes into a dribble routine which dispenses very small individual batches of product into receptacle (32) until the exact targeted amount is reached.

The quantitative measuring and dispensing apparatus of this invention provides a convenient way to accurately measure and dispense solid dry flowable materials; in the case of agricultural materials the quantitative measuring and dispensing apparatus allows last minute changes to acreage or changes in product use rate; keeps records of product use and inventory; helps address worker exposure issues since the transfer of the product can be done in a closed system. The field measuring and dispensing apparatus of this invention provides better accuracy (+/−2%) compared to handheld measuring guide (+/−7%). The field measuring and dispensing apparatus of this invention is portable and can be mounted on a sprayer, in the bed of a pickup truck, or on a nurse tank trailer or truck or any similar vehicle and has been developed to accurately measure water dispersible granules under field conditions where it can operate on readily available 12 volt power. The field measuring and dispensing apparatus allows the operator to measure material at the point of use so that last minute changes to acreage or product use rate can be easily and accurately implemented. Field calibrations can accommodate changes in product bulk density. The apparatus is electronically controlled and can meter dry flowable materials in amounts ranging from about 15 grams to several kilograms accurately.

In the above recitations, the term operator means anyone who uses the system of this invention and in the case of an agricultural product can mean a dealer, or an applicator.

It is understood that the above described embodiments are meant to be illustrative of the principles of this invention and not all possible embodiments of this invention.

What is claimed:

1. A portable apparatus for measuring and dispensing solid dry flowable materials, comprising:
   a hopper for containing material;
   a quantitative measuring device having a dispensing outlet;
   material inlet means in communication with said hopper and said quantitative measuring device for regulating the flow of material therebetween;
   system control means in communication with quantitative measuring device for controlling type of measurement and quantity of material;
   a receptacle in communication with the dispensing outlet of said quantitative measuring device; and
   a material outlet means located between the dispensing outlet and said receptacle for regulating the flow of material therebetween.

2. The apparatus of claim 1 further comprising a power source.

3. The apparatus of claim 2 wherein the power source is a battery.

4. The apparatus of claim 1 wherein the quantitative measuring device is an exchangeable module.

5. The apparatus of claim 1 wherein the quantitative measuring device comprises a weight measuring device.

6. The apparatus of claim 1 wherein the quantitative measuring device comprises a volumetric measuring device.

7. The apparatus of claim 2 wherein means for operating said quantitative measuring device comprises a motor in communication with said power source.

8. The apparatus of claim 2 further comprising a housing to which is mounted said quantitative measuring device.

9. The apparatus of claim 1 wherein the receptacle comprises a liquid distribution means.

10. The apparatus of claim 6 wherein the volumetric measuring device comprises a screw.

11. A method for measuring and dispensing solid dry flowable materials, comprising: feeding the material into the hopper of claims 10, rotating the screw a specified number of turns dependent upon material type and quantity of material desired such that material is transported along the length of the screw to the material outlet means while being measured, and passing the material through the material outlet means and directly into the receptacle.

* * * * *